(12) United States Patent
Brisk

(10) Patent No.: US 7,520,816 B1
(45) Date of Patent: Apr. 21, 2009

(54) GUARD ASSEMBLY FOR EXTENDING AROUND A ROTATING SHAFT

(75) Inventor: Kenneth J. Brisk, Browns Summit, NC (US)

(73) Assignee: Tencarva Machinery Company, Greensboro, NC (US)

( * ) Notice: Subject to any disclaimer, the term of this patent is extended or adjusted under 35 U.S.C. 154(b) by 563 days.

(21) Appl. No.: 11/231,566

(22) Filed: Sep. 21, 2005

(51) Int. Cl.
*F16D 3/84* (2006.01)

(52) U.S. Cl. ....................... 464/172; 464/176

(58) Field of Classification Search .............. 464/170, 464/172, 176; 74/609; 285/149.1, 302
See application file for complete search history.

(56) References Cited

U.S. PATENT DOCUMENTS

| | | | |
|---|---|---|---|
| 3,113,441 A | * | 12/1963 | Weasler ................. 464/172 |
| 3,907,334 A | * | 9/1975 | Schera, Jr. ............. 285/302 X |
| 4,324,533 A | * | 4/1982 | Schroeder et al. ....... 464/170 X |
| 5,711,710 A | | 1/1998 | Brisk |
| 6,241,618 B1 | * | 6/2001 | Doll ...................... 464/176 |

FOREIGN PATENT DOCUMENTS

AT 221375 * 5/1962 ............. 464/170

* cited by examiner

*Primary Examiner*—Greg Binda
(74) *Attorney, Agent, or Firm*—Coats & Bennett, P.L.L.C.

(57) ABSTRACT

A guard assembly is provided for extending around a rotating shaft extending between a driving device and a driven device. The guard assembly includes two plastic pliable covers bent to form two cylindrical housings. One cylindrical housing is slidable within the other and movable between a retracted and an extended position. A split ring adapter is secured to one of the devices and includes a series of lugs that project through circumferential openings in one of the cylindrical housings. Additionally, there is provided an end cap secured to one of the cylindrical housings opposite the adapter plate. There is also provided a series of elongated openings provided in each cylindrical housing and one or more fasteners projecting through respective pairs of openings so as to secure one cylindrical housing to the other and to permit one of the housings to slide with respect to the other when the fasteners are loosened.

16 Claims, 4 Drawing Sheets

GUARD ASSEMBLY FOR EXTENDING AROUND A ROTATING SHAFT

FIELD OF THE INVENTION

The present invention relates to machine guards and more particularly to a guard assembly designed to extend around a rotating shaft extending between a driving device and a driven device.

BACKGROUND OF THE INVENTION

It is common to utilize a driving device, such as an electric motor, to drive a driven device, such as a pump. In these cases a drive shaft extends between the driving device and the driven device. Safety regulations, such as OSHA requirements, require that in certain commercial and industrial settings that a guard be placed around the rotating shaft so as to prevent loose clothing, such as ties and sleeves, from becoming entangled in the equipment.

In my earlier patent, U.S. Pat. No. 5,711,710 (the '710 patent), I disclosed a guard for extending around a rotating shaft. The '710 patent is expressly incorporated herein by reference. The coupling guard disclosed in this patent included a generally U-shaped cover sleeve formed from a flexible sheet of high density, high impact plastic that enclosed the rotating shaft coupling, thereby shielding the coupling so as to prevent body parts and objects from contacting the coupling. When installed, the cover sleeve is spaced from the coupling so as not to interfere with the rotation of shafts or the coupling interposed between the shafts. The cover sleeve is secured with a pair of brackets to a frame structure adjacent the rotating shaft and held stationary with respect to the rotating shaft. The cover sleeve defines two opposed end openings through which the rotating shafts extend.

While the guard assembly of the '710 patent has proven to be successful, the installation of this type of guard assemblies and others in the prior art can be time consuming and awkward. Thus, there is a need for a guard assembly for enclosing an area around a rotating shaft extending between a driving device and a driven device which is easy to install and which can be easily adjusted and secured around the rotating shaft so as to close the open area around the drive shaft.

SUMMARY OF THE INVENTION

The present invention entails a guard assembly for extending around a rotating drive shaft that extends between a driving device and a driven device. The guard assembly includes a first cover that is formed into a generally cylindrical shaped housing and a second cover that is formed into a generally cylindrical shaped housing. One of the cylindrical housings is telescopically contained or held within the other and movable therein between a retracted position and an extended position. An adapter is secured to one of the driving device or the driven device and is further secured to one of the cylindrical housings so as to support the guard assembly around the drive shaft.

In one embodiment, the cylindrical housings are provided with elongated slots and there is provided a series of threaded fasteners that extend through respective pairs of elongated slots. When the threaded fasteners are tightened, this secures one cylindrical housing to the other. When the threaded fasteners are loosened, one cylindrical housing can be moved fore and aft with respect to the other so as to adjust the effective length of the guard assembly.

Further, the present invention entails a guard assembly for extending around a drive shaft extending between a driving device and a driven device. The guard assembly includes a housing and a split adapter for connecting the housing to one of the driving device or driven device. The split adapter includes a frame structure that extends around a generally central opening defined by the frame structure for permitting the drive shaft to extend therethrough when the housing and adapter are installed between the driving device and the driven device. Further, the adapter includes one or more fastener openings for permitting a fastener to extend through the openings to connect to one of the driving or driven devices. In addition, the adapter includes an insert opening formed in at least an outer portion of the frame structure for permitting the drive shaft to pass therethrough when the adapter is being installed on one of the driving or driven devices.

The present invention also entails a method of forming a guard around a rotating drive shaft that extends between a driving device and a driven device. The method includes bending a first pliable cover around the rotating shaft to form a first cylindrical housing. Thereafter the first pliable cover is secured to an adapter that is, in turn, secured to one of the driving or driven devices. More particularly, the first pliable cover is secured to the adapter by projecting one or more lugs that form a part of the adapter into one or more lug openings formed in the first cylindrical housing. A second pliable cover is bent or shaped to form a second cylindrical housing. The method entails telescopically containing one of the cylindrical housings within the other such that one cylindrical housing can slide between a retracted position and an extended position within the other cylindrical housing. One cylindrical housing is secured to the other by utilizing one or more fasteners by extending each fastener through a pair of adjacently disposed elongated openings in the first and second housings. One of the cylindrical housings can slide within the other while one or more fasteners project through the elongated openings, and further one of the cylindrical housings can be secured with respect to the other by tightening one or more of the fasteners. Other objects and advantages of the present invention will become apparent and obvious from a study of the following description and the accompanying drawings which are merely illustrative of such invention.

DESCRIPTION OF EXEMPLARY EMBODIMENT

Figure 1:
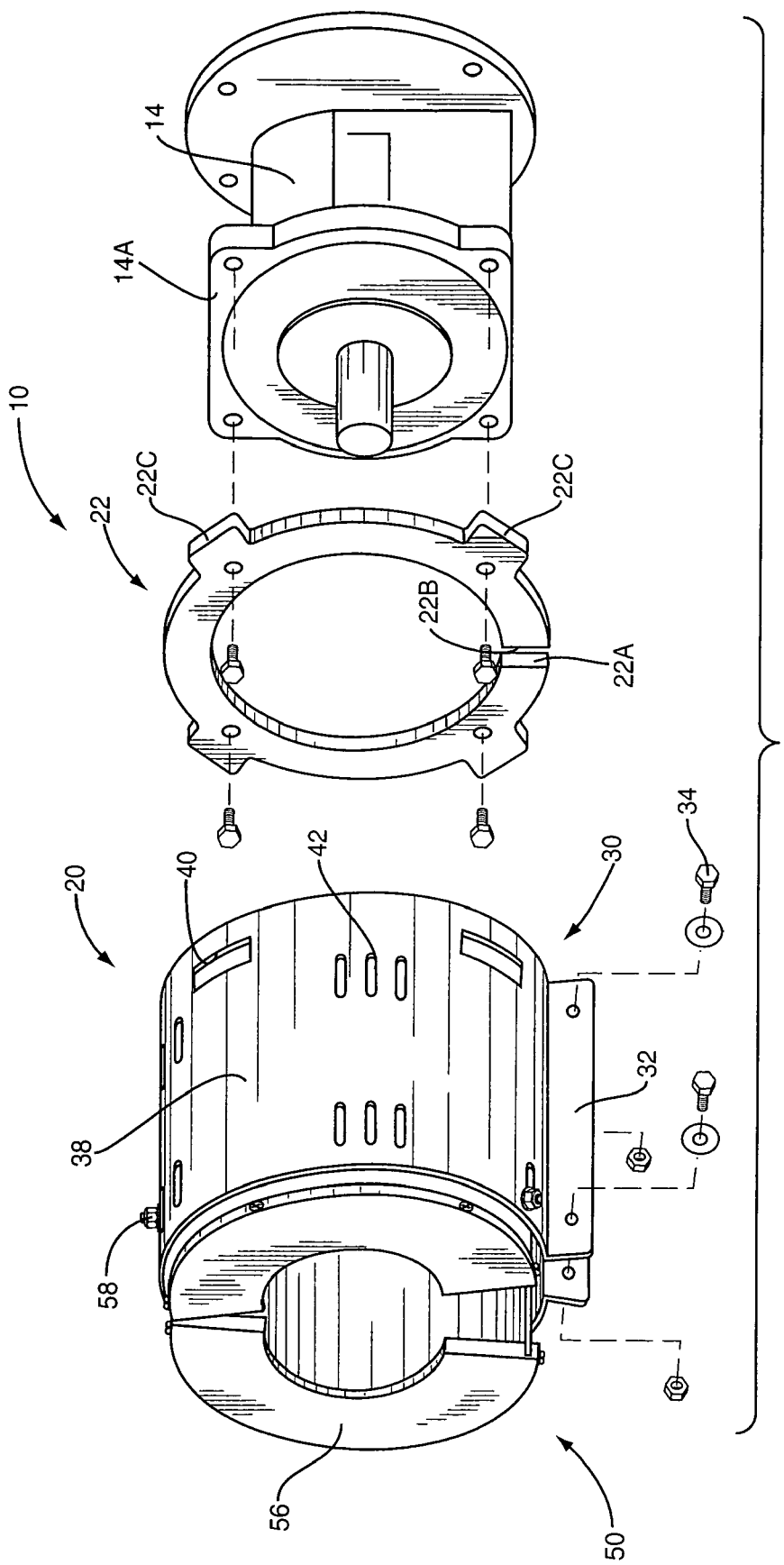
FIG. 1 is an exploded perspective view illustrating the guard assembly of the present invention.
Figure 5:
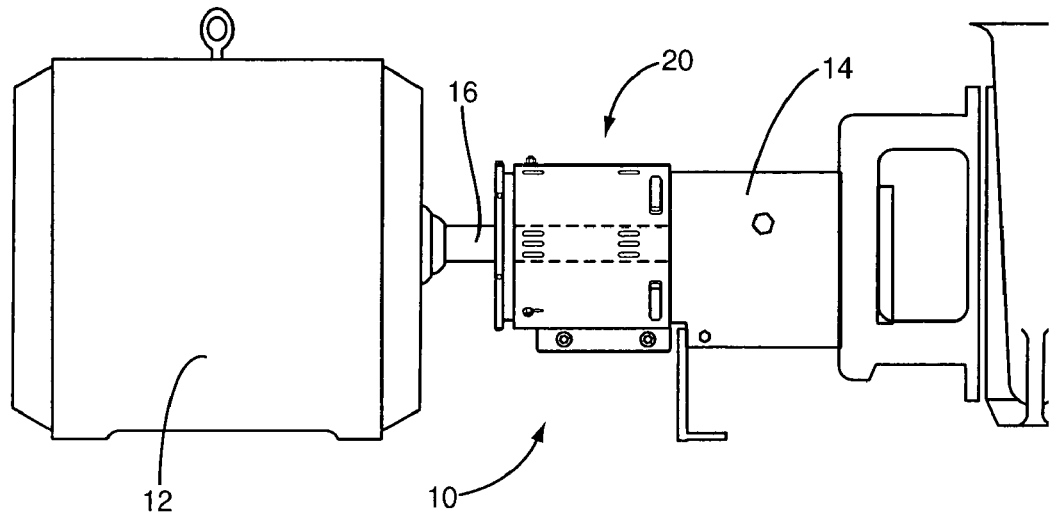
FIG. 5 is a side elevational view showing the guard assembly in a retracted position and disposed between driving and driven devices.
Figure 6:
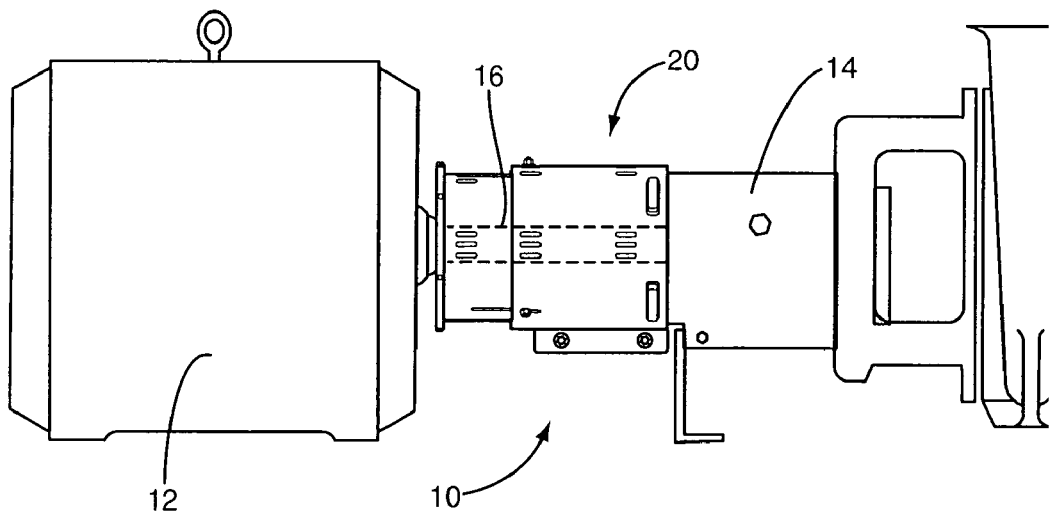
FIG. 6 is a view similar to FIG. 5 but with the guard assembly shown in an extended position.

With further reference to the drawings, particularly FIG. 1, the guard assembly of the present invention is shown therein and indicated generally by the numeral 10. Guard assembly 10 includes a housing structure indicated generally by the numeral 20 and an adapter, indicated generally by the numeral 22. As seen in FIGS. 5 and 6, guard assembly 10 is designed to be interposed between two devices that are referred to herein as a driving device 12 and a driven device 14. More particularly, the guard assembly 10 is designed to be disposed between these two devices such that the guard assembly extends around a drive shaft or drive shaft assembly indicated by the numeral 16. Guard assembly 10 surrounds the drive shaft and generally prevents outside contact with the drive shaft 16 particularly while the same is rotating.

In practice, the driving device 12 and the driven device 14 may comprise various machines. However, in one typical application the driving device 12 comprises an electric motor while the driven device 14 comprises a pump. In this case, both the electric motor 12 and the pump 14 would include a stub drive shaft. Typically the stub drive shafts extending outwardly of the electric motor 12 of the pump 14 would be coupled together by a coupling device. Thus, in one embodiment, the drive shaft extending between the electric motor 12 and the pump 14 would include the respective stub shafts along with the coupling device. This assembly is simply referred to as a drive shaft.

Adapter 22, as illustrated in FIG. 1, is designed to be secured to the face 14A of the pump or driven device 14. In addition, adapter 22 is designed to be secured to the housing 20 such that the housing is supported by the adapter 22 in cantilever fashion. That is, as seen in FIGS. 1-4, the housing 20 projects outwardly from and is supported by the adapter 22. Details of how the adapter 22 and how it connects to and supports the housing 20 will be dealt with subsequently herein.

Figure 3:
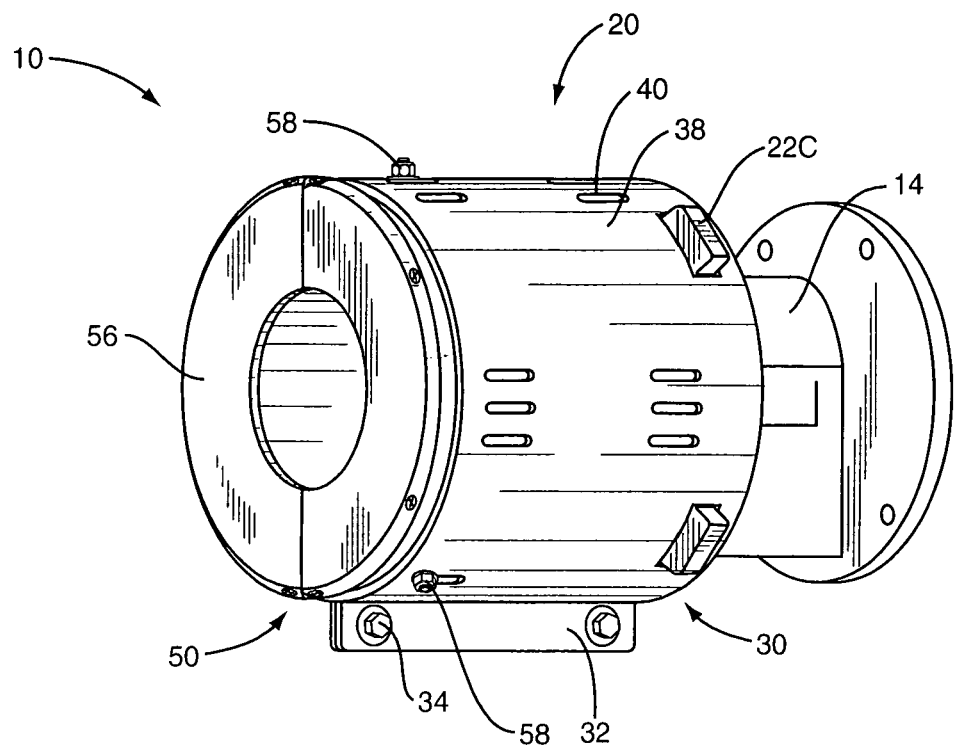
FIG. 3 is a perspective view showing the guard assembly mounted to the driven device.
Figure 4:
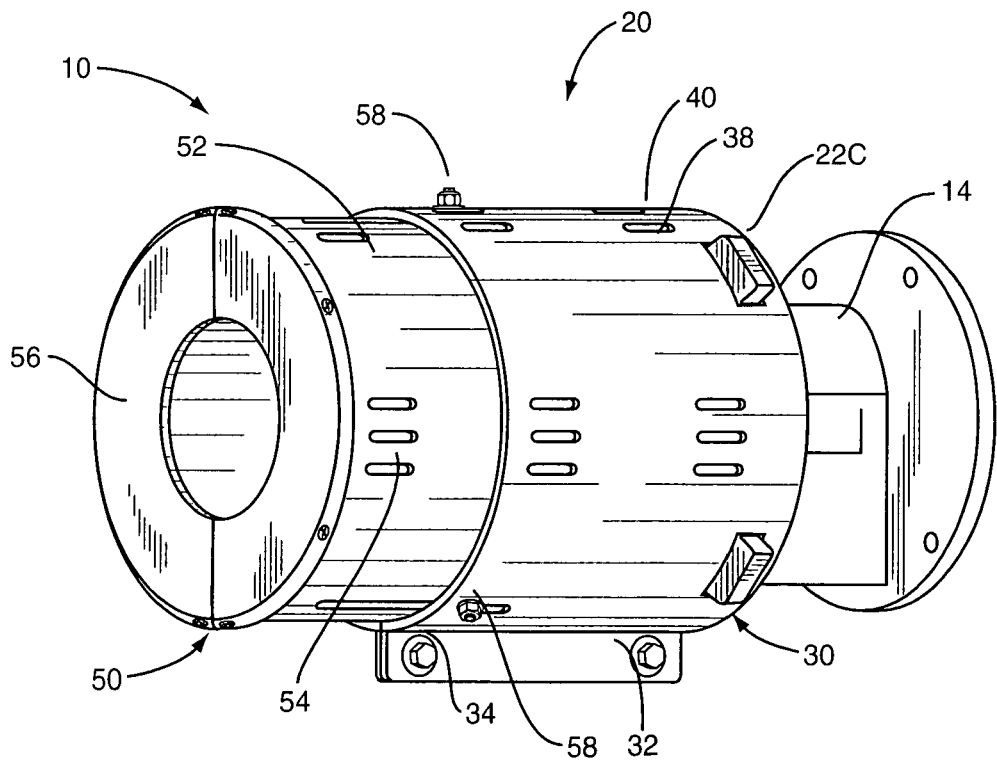
FIG. 4 is a perspective view, similar to FIG. 3, but showing the guard assembly in an extended position.

Turning to a discussion of the housing 20, the housing 20 comprises a first cover indicated generally by the numeral 30, and a second cover indicated generally by the numeral 50. First and second covers 30 and 50 can be bent or shaped to form two cylindrical housing structures. As will be described subsequently herein, the two cylindrical housing structures are telescopically contained such that one of the housing structures can be moved back and forth with respect to the other between a retracted position (FIG. 3) and an extended position (FIG. 4).

Figure 2:
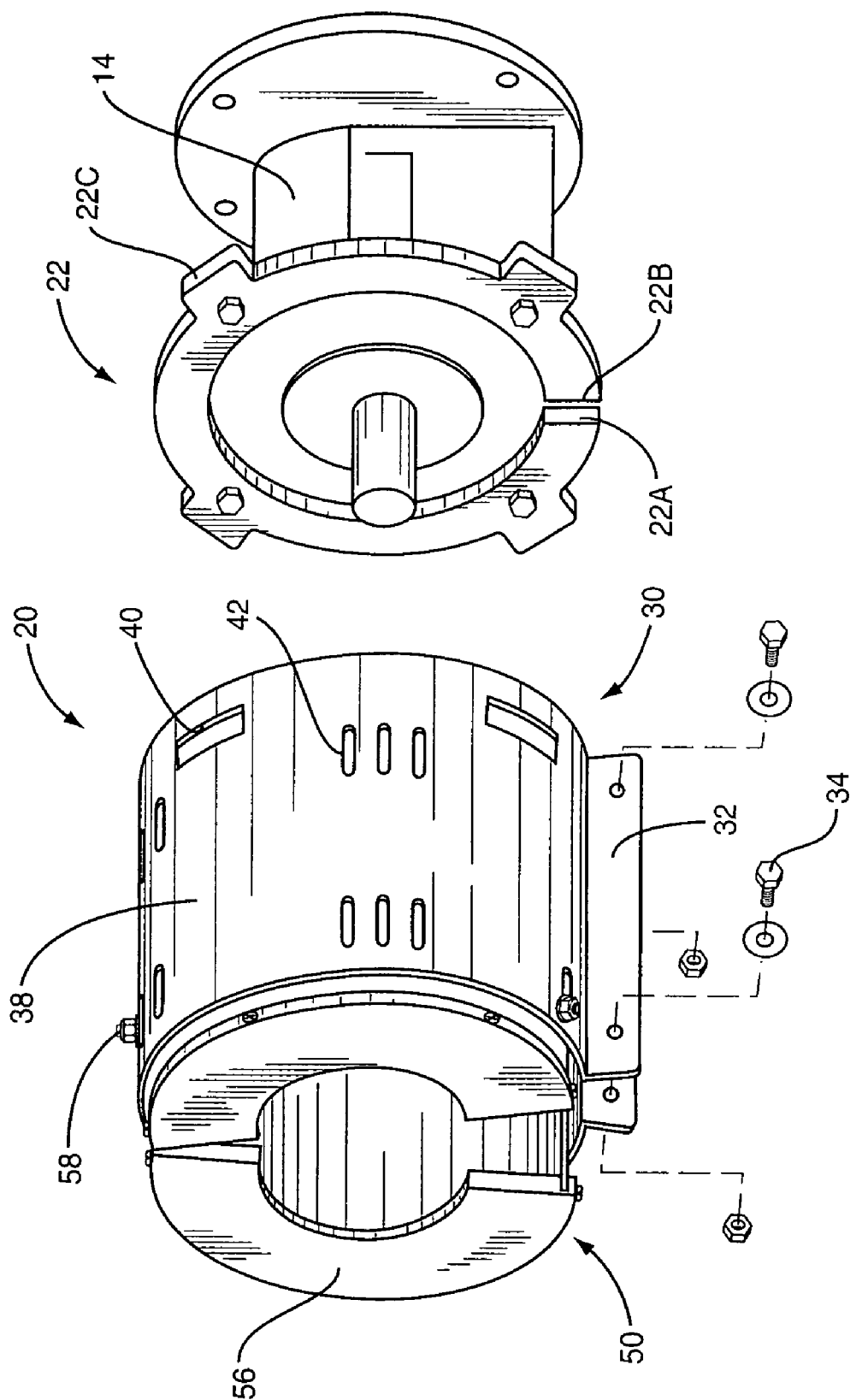
FIG. 2 is a view similar to FIG. 1 but showing the adapter of the guard assembly being mounted to a driven device.

First cover 30, comprises a pliable sheet of material such as plastic or a high density polyurethane structure. Cover 30 can be flexed and bent and while the same may assume a sheet form the cover can be curved to form a cylindrical housing such as shown in FIGS. 1-4. Cover 30 includes opposed end portions. Each end portion includes a flange 32 that is disposed at an angle with respect to the main body of the cover 30. Cover 30, as shown in FIG. 3 for example, assumes an operative mode. Here the opposed flanges 32 are secured together by bolt assemblies 34. This forms a cylindrical housing having a cylindrical wall 38 which in turn forms an open interior space. Cylindrical wall 38 includes a number of openings. First, about one end portion of the cylindrical wall 38 there is provided a series of circumferentially spaced openings that are referred to as lug openings 40. As will be appreciated from subsequent portions of this disclosure, these lug openings 40 facilitate securing the first cover 30 to the adapter 22. In addition, cylindrical wall 38 includes a series of elongated openings 42. In the case of the embodiment disclosed herein, as viewed in FIGS. 1-4, there is provided two sets of elongated openings 42 in the cylindrical wall 38. Each set of elongated openings are axially spaced from each other and the openings of each set are circumferentially spaced around the cylindrical wall 38.

Turning to the second cover 50, the same is provided in a sheet form, and like the first cover 30, is pliable or bendable such that the sheet form of the structure can be shaped into a cylindrical housing. Various materials can be used for both the first cover 30 and the second cover 50. However, as noted above, it is contemplated that in one embodiment the material will comprise plastic or a high density polyurethane structure. Continuing to refer to the second cover 50, when the same assumes an operative mode, as shown in FIGS. 3 and 4 for example, the second cover forms a cylindrical wall 52. Cylindrical wall 52 includes a series of elongated openings 54. Elongated openings 54 formed in cylindrical wall 52 are spaced so as to register or align with the elongated openings 42 formed in the cylindrical wall 38 of the first cover 30.

One end of cylindrical wall 52 is partially closed by an end cap 56. In particular, end cap 56 comprises two opposed C sections that are secured to an end portion of the cylindrical wall 52. The C sections of the end cap 56 define a central opening that permits the drive shaft 16 to extend therethrough.

In the case of the embodiment illustrated herein, the cylindrical housing formed by the second cover 50 is telescopically contained within the cylindrical housing formed by the first cover 30. That is, the cylindrical wall 52 and the housing structure formed thereby can be moved back and forth within the cylindrical wall 38 of the first cover 30. As illustrated in FIG. 3, the cylindrical housing formed by the second cover 50 is shown therein in a retracted position. From that position the cylindrical wall 52 can be extended outwardly as shown in FIG. 4. This essentially enables the guard assembly 10 to be adjusted in length such that it can be used in various applications where the length of the drive shaft 16 to be protected varies. When the first cover 30 and the second cover 50 assume a cylindrical configuration, the guard includes an axis and the elongated openings 38 and 54 formed in the first and second covers extend generally parallel to the axis.

As noted above, both cylindrical walls 38 and 52 have like elongated openings 42 and 54. Some of these openings can function as ventilation openings. However, other elongated openings 42 and 54 can be utilized to secure the inner cylindrical housing to the outer cylindrical housing. There is provided a series of bolt assemblies 58 for accomplishing this function. As seen in FIGS. 3 and 4 for example, a series of bolt assemblies 58 extend through aligned pairs of elongated openings 42 and 54. When the guard assembly 10 is installed between an electric motor 12 and a pump 14 and when the length of the guard assembly has been properly adjusted, the bolt assemblies 58 can be tightened down so as to secure the inner cylindrical housing within the outer cylindrical housing. Thus, in this case the two cylindrical housings are stationed with respect to each other. However, during a period or time of adjustment where the inner cylindrical housing is moved back and forth with respect to the outer cylindrical housing, the bolt assembly 58 would assume a loosened state and therefore the elongated slots 54 of the inner cylindrical housing could move with respect to the elongated slots 42 of the outer cylindrical housing.

Turning to the adapter 22, it should be noted that the adapter can be constructed of various materials. However, it is contemplated in one embodiment that the adapter 22 would be constructed of a strong and sturdy material that would have some flexibility. For example, the adapter 22 could be constructed of a plastic or a hard rubber. In any event, the adapter 22 is a split adapter in that it includes an opening formed in the frame structure thereof. In particular, the adapter 22 assumes a split ring configuration where the ring includes opposed ends 22A and 22B. See FIG. 1 for example. Between ends 22A and 22B there is provided an opening and this is sometimes referred to as a shaft insert opening. That is, as illustrated in FIGS. 1 and 2, in installing the adapter 22 onto the driven device 14 an installer may be confronted with a drive shaft 16 that extends continuously from the driving device 12 to the driven device 14. In that case, in order to properly mount the adapter 22 to the driven device 14, the split ring frame structure will require being slightly flexed to form an opening between ends 22A and 22B that will permit the drive shaft 16 to pass therethrough. It further follows as viewed in FIGS. 1 and 2 that the internal area of the adapter 22 is open to permit the drive shaft 16 to pass therethrough. To secure the adapter 22 to the driven device 14, a series of bolts are extended through bolt openings in the frame or ring structure of the adapter and screwed into the flange or faceplate 14A of the driven member.

To install the guard assembly 10 around a drive shaft 16 that extends between an electric motor 12 and a pump 14, for example, where there is a continuous drive shaft 16 extending between the two, the adapter 22 would be bolted to the face or flange 14A of the pump. Again, this would be accomplished as described above by simply flexing the frame structure or ring of the adapter 22 so as to form an opening between ends 22A and 22B sufficient for the drive shaft 16 to pass therethrough. Once the drive shaft 16 is passed through this opening, the frame or ring structure can be bolted to the pump 14.

Next the first cover 30 is formed into a cylindrical housing by securing the flanges 32 together such as shown in FIG. 3. This is accomplished by extending bolt assemblies 34 through the openings formed in the respective flanges 32. This, of course, forms a cylindrical housing. Prior to securing the flanges 32 together, one end portion of the first cover is placed around the adapter 22. More particularly, the adapter 22 includes a series of circumferentially spaced lugs 22C projecting outwardly therefrom. See FIGS. 1 and 2. These lugs 22C are inserted into the lug openings 40 formed around one end portion of the cylindrical housing formed by the first cover 30. Once the lugs 22C have been extended through the lug openings 40, the flanges 32 can then be secured together. Thus, it is seen that the cylindrical housing formed by the first cover 30 is supported in cantilevered fashion by the adapter 22.

Now the second cover 50 can be bent or shaped to form a cylindrical housing. This is typically achieved by the hand of an installer. Once the second cover 50 has been shaped into a cylindrical housing, it is inserted into the end of the cylindrical housing formed by the first cover. This is illustrated in FIGS. 1 and 2. Next, bolt assemblies 58 can be connected in pairs of elongated openings 54 and 42 formed in the cylindrical walls 38 and 52 of the two cylindrical housings. Thereafter the inner cylindrical housing and its cylindrical wall 52 can be moved back and forth between retracted and extended positions to adjust the length of the guard assembly 10 to match the length of the drive shaft 16 extending between the driving device 12 and the driven device 14.

From the foregoing discussions and specification, it is apparent that the guard assembly of the present invention has many advantages. One advantage is that the guard assembly is constructed of a strong material that will protect an isolate the drive shaft 16. Further, the design of the guard assembly enables the same to be quickly and easily installed and adjusted by a single installer.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A guard assembly for extending around a rotating drive shaft that extends between a driving device and a driven device, the guard assembly comprising:
    a. a first split cover comprising a sheet of bendable material having opposed end portions with each end portion having a flange, and wherein in an operative mode the first cover assumes a cylindrical configuration and in the cylindrical configuration the cover includes a cylindrical wall and the two flanges are disposed adjacent each other;
    b. one or more fasteners for securing the two flanges;
    c. a series of circumferentially spaced lug openings formed in the first cover about one end portion of the first cover;
    d. a split adapter for securing to either the driving device or the driven device and including a series of circumferentially spaced lugs that project into and are received by the circumferentially spaced lug openings in the first cover;
    e. a second split cover comprising a bendable material and having opposed end portions and wherein in one mode the bendable material assumes a cylindrical configuration and in the cylindrical configuration the second cover includes a cylindrical wall;
    f. one of the first or second covers being telescopically contained in the other and movable back and forth therein between a retracted position and an extended position;
    g. a series of elongated openings formed in the cylindrical walls of the first and second cover;
    h. fasteners extending through the elongated openings formed in the cylindrical walls of the first and second covers for securing the covers together and generally stationing one cover with respect to the other; and
    i. an end cap disposed on the end of the guard assembly opposite the adapter.

2. The guard assembly of claim 1 wherein when the first and second covers assume the cylindrical configuration, the guard assembly includes an axis and wherein the elongated openings formed in the cylindrical walls of the first and second covers extend generally parallel to the axis.

3. The guard assembly of claim 1 wherein the second cover is disposed interiorly of the first cover and slides back and forth therein between the retracted and extended positions.

4. The guard assembly of claim 3 wherein the end cap comprises a split end cap that is secured to an end portion of the second cover.

5. The guard assembly of claim 1 wherein the lugs of the adapter plate project into and through the lug openings of the first cover such that the lugs of the adapter plate extend outwardly from the cylindrical wall of the first cover.

6. The guard assembly of claim 1 wherein the end cap comprises a pair of generally C-shaped sections that are adapted to assume a closed position and when in the closed position there is an opening formed between the C-shaped sections to accommodate the drive shaft.

7. The guard assembly of claim 1 wherein the elongated openings formed in the cylindrical walls of the first and second covers include two sets of elongated openings in each cover, one set being axially spaced from the other and with the respective elongated openings of each set being circumferentially spaced around the cylindrical wall of each cover.

8. The guard assembly of claim 1 wherein the first and second covers are constructed of a pliable polyurethane structure.

9. A guard assembly for extending around a drive shaft that extends between a driving device and a driven device, comprising:
   a. a housing that extends around at least a portion of the drive shaft;
   b. a split adapter for connecting the housing to one of the driving device or driven device;
   c. the split adapter including a frame structure that extends around a generally central opening defined by the frame structure for permitting the drive shaft to extend therethrough when the housing and adapter are installed between the driving device and the driven device;
   d. the adapter including one or more fastener openings for permitting a fastener to extend through the one or more openings to connect to one of the driving or driven devices;
   e. a shaft insert opening formed in at least an outer portion of the frame structure for permitting the drive shaft to pass therethrough when the adapter is being installed on one of the driving or driven devices; and
   f. wherein the split adaptor is constructed of a plastic material and is flexible and wherein the size of the shaft insert opening can be varied by flexing the frame structure on opposite sides of the shaft opening.

10. The guard assembly of claim 9 wherein the housing includes first and second cylindrical housings with one cylindrical housing being telescopically contained with the other; and a plurality of elongated openings formed in the first and second cylindrical housings and a fastener extending through respective pairs of the elongated openings for securing the first and second cylindrical housings together when the fasteners are tightened and permitting one of the first and second cylindrical housings to be moved between retracted and extended positions with respect to the other cylindrical housings when the fasteners are loosened.

11. The guard assembly of claim 9 wherein the frame structure of the split adapter is in the shape of a ring and includes two terminal ends that define the shaft insert opening.

12. The guard assembly of claim 11 wherein the ring-shaped frame structure includes a plurality of generally circumferentially spaced lugs projected outwardly therefrom.

13. A guard assembly for extending around a drive shaft that extends between a driving device and a driven device, comprising:
   a. a housing assembly for extending around the drive shaft;
   b. the housing assembly including first and second telescoping cylindrical housings where one cylindrical housing moves back and forth with respect to the other between extended and retracted positions;
   c. a series of elongated openings formed in the first and second cylindrical housings and wherein the elongated openings in one of the cylindrical housings is at least partially aligned with the elongated openings in the other cylindrical housing;
   d. a series of threaded fasteners extending through pairs of the elongated openings such that when tightened the threaded fasteners secure the first and second cylindrical housings together and when loosened one of the cylindrical housings is permitted to move back and forth between the extended and retracted positions so as to effectively adjust the length of the housing assembly; and
   e. a split adaptor connected to the housing assembly and wherein the split adaptor is adapted to be connected to one of the driving device or the driven device.

14. The guard assembly of claim 13 wherein the split adapter includes a split ring that includes two terminal ends that are disposed adjacent each other but which define an opening therebetween that permits the drive shaft to pass therebetween when the adapter is being installed on one of the driving device or the driven device.

15. The guard assembly of claim 14 wherein each of the first and second cylindrical housings include a bendable sheet that includes opposed end portions wherein each opposed end portion of at least one sheet includes a flange, and wherein there is provided a series of fasteners for securing the flanges together.

16. A guard assembly for extending around a drive shaft that extends between a driving device and a driven device, comprising:
   a. a housing that extends around at least a portion of the drive shaft;
   b. a split adapter for connecting the housing to one of the driving device or driven device;
   c. the split adapter including a frame structure that extends around a generally central opening defined by the frame structure for permitting the drive shaft to extend therethrough when the housing and adapter are installed between the driving device and the driven device;
   d. the adapter including one or more fastener openings for permitting a fastener to extend through the one or more openings to connect to one of the driving or driven devices;
   e. a shaft insert opening formed in at least an outer portion of the frame structure for permitting the drive shaft to pass therethrough when the adapter is being installed on one of the driving or driven devices;
   f. wherein the frame structure of a split adaptor is in the shape of a ring and includes two terminal ends that define the shaft insert opening; and
   g. wherein the ring shaped frame structure includes a plurality of generally circumferentially spaced lugs projecting outward therefrom.

* * * * *